United States Patent [19]

Weaver et al.

[11] Patent Number: 5,554,720

[45] Date of Patent: Sep. 10, 1996

[54] NAPHTHALENEDICARBOXYLIC ACID POLYMERS CONTAINING ARYL THIOETHERS AND HAVING REDUCED FLUORESCENE

[75] Inventors: Max A. Weaver, Kingsport, Tenn.; David E. Mills, Wake Forest, N.C.; James Tanner, III, Kingsport, Tenn.; Jean C. Fleischer, Kingsport, Tenn.; Wayne P. Pruett, Kingsport, Tenn.; L. Shane Moody, Johnson City, Tenn.

[73] Assignee: Eastman Chemical Company, Kingsport, Tenn.

[21] Appl. No.: 360,549

[22] Filed: Dec. 21, 1994

[51] Int. Cl.$^6$ .................... C08G 63/688; C08G 75/00
[52] U.S. Cl. ................ 528/295; 528/288; 528/294; 528/298; 528/308; 528/373; 525/437
[58] Field of Search .................... 528/288, 294, 528/295, 298, 308, 373; 525/437

[56] References Cited

PUBLICATIONS

Chen Shangxian et al, "Fluorescence Spectra of Poly(Ethylene–2–6–Naphthalene Dicarboxylate)", *Scientia Sinica*, vol. XXIV, No. 5, May 1981.

CAO Ti et al., "Intermolecular Excimer Interaction in Poly-(Polytetramethylene Ether Glycol Aryl Dicarboxylate)", *ACTA Chimica Sinica*, vol. 42, No. 1, 1984.

*Primary Examiner*—Samuel A. Acquah
*Attorney, Agent, or Firm*—John D. Thallemer; Harry J. Gwinnell

[57] ABSTRACT

This invention relates to polymer compositions containing naphthalenedicarboxylic acid residues and having reduced fluorescence due to the presence of aromatic thioether compounds. More specifically, the polymer compositions contain poly(ethylene 2,6-naphthalene dicarboxylate) and 0.1 to 5 mole percent of an aromatic thioether compound. The pollers are useful for packaging applications where clarity and/or aesthetic appeal is important.

14 Claims, No Drawings

NAPHTHALENEDICARBOXYLIC ACID POLYMERS CONTAINING ARYL THIOETHERS AND HAVING REDUCED FLUORESCENE

FIELD OF THE INVENTION

The present invention relates to polymer compositions containing naphthalenedicarboxylic acid residues and having reduced fluorescence due to the presence of aromatic thioether compounds.

BACKGROUND OF THE INVENTION

Naphthalenedicarboxylic acid is used to make extrusion and injection-molding resins because of the good heat resistance, high glass transition temperature, and gas barrier properties of naphthalenedicarboxylic acid based polymers. Polymers containing naphthalenedicarboxylic acid residues are used in the fabrication of various articles for household or industrial use, including appliance parts, containers, and auto parts. One major drawback of polymers containing naphthalenedicarboxylic acid residues, however, is their inherent bluish fluorescence. Thus, objects prepared with polymers containing naphthalenedicarboxylic acid residues have a hazy and bluish appearance. This phenomenon is especially of concern in the packaging of foods and beverages wherein the food or beverage inside a container made from a naphthalenedicarboxylic acid containing polymer appears unnatural.

The fluorescence of homopolymers of poly(ethylene 2,6-naphthalenedicarboxylate), referred to as PEN, is known in the art. Because of the improved properties of polymers containing naphthalenedicarboxylic acid residues, it is desirable to incorporate small amounts of naphthalenedicarboxylic acid in polymers such as poly(ethylene terephthalate) (PET). However, copolymers containing very small amounts of naphthalenedicarboxylic acid residues fluoresce with intensity similar to, or in some cases greater than PEN homopolymers. Surprisingly, PET modified by copolymerizing in less than 1 mole percent naphthalenedicarboxylic acid has significant visible fluorescence.

Fluorescence is a type of luminescence in which an atom or molecule emits radiation in passing from a higher to a lower electronic state. The term is restricted to phenomena in which the time interval between absorption and emission of energy is extremely short ($10^{-10}$ to $10^{-6}$ second). Fluorescence in a polymer or small molecule, occurs when a photon is emitted from an excited singlet state. Quenching of fluorescence eliminates or reduces the ability for photon emission by providing an alternative pathway for the excited state energy such as vibronic or heat loss, or intersystem crossing to the excited triplet state.

Methods to quench fluorescence in PEN have been disclosed by Chen Shangxian et al. in an article entitled, "Fluorescence Spectra Of Poly(Ethylene-2,6-Naphthalene Dicarboxylate)" which appeared in *SCIENTIA SINICA*, Vol. XXIV, No. 5, May 1981, and by CAO Ti et al. in an article entitled, "Intermolecular Excimer Interaction In Poly(Polytetramethylene Ether Glycol Aryl Dicarboxylate)" which appeared in *ACTA CHIMICA SINICA*, Vol. 42, No. 1, 1984. Both of the references disclose the use of o-chlorophenol to quench PEN fluorescence in a chloroform solution. Dissolving the PEN in a chloroform solution to disperse the fluorescence quencher therein, however, is not practical on an industrial scale because only very dilute PEN solutions can be prepared. In addition, the PEN must have a low molecular weight to dissolve in the chloroform solution.

Accordingly, what is needed in this art is a method to quench fluorescence in PEN containing polymers without deleteriously affecting the physical properties of the PEN containing polymers.

SUMMARY OF THE INVENTION

The present invention relates to a naphthalenedicarboxylic acid containing polymer composition with reduced fluorescence comprising condensation residues of:

(a) a dicarboxylic acid component which comprises at least 0.1 mole percent of 2,6-naphthalenedicarboxylic acid or 2,6-naphthalenedicarboxylate ester;

(b) a diol or diamine component; and (c) 0.1 to 5 mole percent, based on 100 mole percent dicarboxylic acid and 100 mole percent diol or diamine, of an aromatic thioether having the formula $Ar(SR)_n$ wherein n is 1 or more; R is selected from the group consisting of $C_1$ to $C_{12}$-alkyl, $C_5$ to $C_7$-cycloalkyl, $C_3$ to $C_8$-alkenyl, $C_3$ to $C_8$-alkynyl, aryl, and —L—X, wherein L is an organic divalent linking group, and X is a polyester reactive group; Ar is an aromatic radical selected from the group Consisting of benzene, naphthalene, biphenyl, and

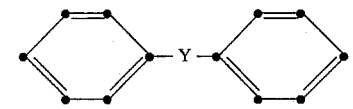

wherein Y is selected from the group consisting of

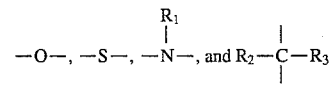

wherein $R_1$ is selected from the group consisting of $C_1$ to $C_{12}$-alkyl, $C_5$ to $C_7$-cycloalkyl, aryl, and —L—X, and $R_2$ and $R_3$ are independently selected from the group consisting of $C_1$ to $C_6$-alkyl and aryl, provided that at least one polyester reactive group X is present on the aromatic thioether.

In another embodiment of the present invention, the aromatic thioether compound, component (c), is admixed or melt blended in an amount of 0.1 to 5 weight percent, preferably 0.5 to 2 weight percent, based on the total weight of the polymeric composition, with a polymer containing naphthalenedicarboxylic acid residues.

DESCRIPTION OF THE INVENTION

The polymers of the present invention contain residues of naphthalenedicarboxylic acid and an aromatic thioether compound. The aromatic thioether compound may be copolymerized or reacted in the polymer. Alternatively, the aromatic thioether compound may be admixed or melt blended with a polymer containing naphthalenedicarboxylic acid residues. Preferably, the polymers contain repeat units from a dicarboxylic acid, a diol or a diamine, and an aromatic thioether compound. Component (a) is a dicarboxylic acid which consists of at least 0.1 mole percent of 2,6-naphthalenedicarboxylic acid or 2,6-naphthalenedicarboxylate ester.

The dicarboxylic acid component, component (a), may optionally include one or more different monomers other than 2,6-naphthalenedicarboxylic acid and 2,6-naphthalenedicarboxylate ester. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with 2,6-naphthalenedicarboxylic acid or 2,6-naphthalenedicarboxylate ester are: terephthalic acid, dimethyl terephthalate, isophthalic acid, cyclohexanediacetic acid, diphenyl-4,4'-dicarboxylic acid, succinic acid, glutaric acid, adipic acid, fumaric acid, azelaic acid, sebacic acid, 2,7-naphthalenedicarboxylic acid, 1,4-cyclohexanedicarboxylic acid, resorcinoldiacetic acid, diglycolic acid, 4,4'-oxybis(benzoic) acid, biphenyldicarboxylic acid, 1,12-dodecanedicarboxylic acid, 4,4'-sulfonyldibenzoic acid, 4,4'-methylenedibenzoic acid, trans-4,4'-stilbenedicarboxylic acid, and the like.

It should be understood that use of the corresponding acid anhydrides, esters, and acid chlorides of these acids is included in the term "dicarboxylic acid". The polymer may be prepared from one or more of the above dicarboxylic acids or esters.

Component (b) is a diol or diamine. Suitable diols include cycloaliphatic diols preferably having 6 to 20 carbon atoms or aliphatic diols preferably having 2 to 20 carbon atoms. Specific examples of diols are: ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxy phenyl)-propane, and 2,2-bis-(4-hydroxypropoxyphenyl)-propane.

The polyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Naphthalenedicarboxylic acid containing polyamides can be formed from adipic acid, isophthalic acid, terephthalic acid, 1,3- or 1,4-cyclohexanedicarboxylic acid, aliphatic diacids containing 6 to 12 carbon atoms, aliphatic amino acids or lactams with 6 to 12 carbon atoms, 1,6-hexanediamine, meta- or para-xylylenediamine, 1,3- or 1,4-cyclohexane(bis)methylamine, aliphatic diamines with 4 to 12 carbon atoms, and other polyamide forming diacids and diamines. The polymer may be prepared from one or more of the above diols or diamines.

The polymer may also contain polycarbonate repeat units formed from the reaction of a carbonic acid derivative with a diol such as bisphenol A. The polymer may be a blend of the above-described polyesters, polyamides, polycarbonates, or polyesteramides.

When copolymerized the aromatic thioether compound, component (c), is present in an amount of 0.1 to 5 mole percent, preferably 0.5 to 2 mole percent, based on 100 mole percent dicarboxylic acid and 100 mole percent diol or diamine. Using more than 5 mole percent of the aromatic thioether hinders the crystallization of the polymer and results in inferior physical properties. Preferably, the aromatic thioether compound is copolymerized in the polymer backbone. In the case of a concentrate, the aromatic thioether compound is either melt blended or copolymerized at much higher than desired concentrations. This concentrated sample is then melt blended with the naphthalenedicarboxylic acid containing polymer to obtain the desired composition.

In another embodiment of the present invention, the aromatic thioether compound, component (c), is admixed or melt blended in an amount of 0.1 to 5 weight percent, preferably 0.5 to 2 weight percent, based on the total weight of the polymeric composition, with a polymer containing naphthalenedicarboxylic acid residues.

The aromatic thioether compound, component (c), has the general structure $Ar(SR)_n$ wherein n is 1 or more, preferably 2. R is selected from $C_1$ to $C_{12}$-alkyl, $C_5$ to $C_7$-cycloalkyl, $C_3$ to $C_8$-alkenyl, $C_3$ to $C_8$-alkynyl, aryl, or —L—X, wherein L is an organic divalent linking group, and X is a polyester reactive group. Preferred reactive groups X are selected from hydroxy, carboxy, $CO_2R_4$ and $OCOR_4$ where $R_4$ is $C_1$–$C_4$ alkyl.

Ar is an aromatic radical selected from benzene, naphthalene, biphenyl, or

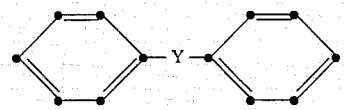

wherein Y is selected from

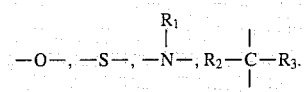

In the above formula, $R_1$ is selected from $C_1$ to $C_{12}$-alkyl, $C_5$ to $C_7$-cycloalkyl, aryl, or —L—X, and $R_2$ and $R_3$ are independently selected from $C_1$ to $C_6$-alkyl or aryl.

In the above definitions the term "$C_1$ to $C_6$-alkyl" and "$C_1$ to $C_{12}$-alkyl" are used to include straight and branched chained hydrocarbon radicals containing up to 6 and up to 12 carbon atoms, respectively, and these substituted with one of more groups selected from $C_1$ to $C_6$-alkoxy, halogen, aryl, $C_5$ to $C_7$-cycloalkyl, or cyano.

The term "aryl" as used herein denotes a phenyl or naphthyl radical and these containing one or more substituents selected from $C_1$ to $C_6$-alkyl, $C_1$ to $C_6$-alkoxy, halogen, $C_1$ to $C_6$-alkylthio, phenylthio, substituted phenylthio or hydroxy.

The terms "$C_3$ to $C_8$-alkenyl" and "$C_3$ to $C_8$-alkynyl" are used to denote aliphatic hydrocarbon moieties having 3 to 8 carbon atoms and at least one carbon-carbon double bond or carbon-carbon triple bond, respectively.

The term "halogen" is used to indicate bromine, chlorine, fluorine, and iodine. The term "$C_5$ to $C_7$-cycloalkyl" is used to describe a cycloaliphatic radical containing 5 to 7 ring carbons and which may be substituted further with one or more $C_1$ to $C_6$-alkyl groups.

In the term "$C_1$ to $C_6$-alkoxy", the alkyl portion of the group is a straight or branched hydrocarbon radical containing 1 to 6 carbon atoms.

In the definition of L, the term "organic divalent linking group" includes $C_1$ to $C_{12}$-alkylene, $C_1$ to $C_4$-alkylene-cyclohexylene-$C_1$ to $C_4$-alkylene, arylene, $C_1$ to $C_4$-alkylene arylene, $C_1$ to $C_4$-alkylene-S-arylene, $C_1$ to $C_4$-alkylene-O-arylene, $C_1$ to $C_4$-alkylene-arylene-$C_1$ to $C_4$-alkylene, $C_1$ to $C_4$-alkylene-S-arylene-S-$C_1$ to $C_4$-alkylene, $C_1$ to $C_4$-alkylene-O-arylene-O-$C_1$ to $C_4$-alkylene, $C_1$ to $C_4$-alkylene-Z-$C_1$ to $C_4$-alkylene or $-(CH_2CH_2O)_mCH_2CH_2-$, wherein "arylene" is used to denote 1,2-, 1,3- and 1,4-phenylene and these substituted with one or more groups selected from $C_1$ to $C_6$-alkyl, $C_1$ to $C_6$-alkoxy, halogen, carboxy and $C_1$ to $C_6$-alkoxycarbonyl; the term "cyclohexylene" is used to denote 1,2-, 1,3-, and 1,4-cyclohexylene radicals; the terms "$C_1$ to $C_4$-alkylene" and "$C_1$ to $C_{12}$-alkylene" are used to denote straight or branched aliphatic hydrocarbon radicals containing up to 4 and up to 12 carbon atoms, respectively, and these substituted with one or more groups selected from hydroxy, $C_1$ to $C_6$-alkanoyloxy, carboxy, $C_1$ to $C_6$-alkoxycarbonyl, $C_1$ to $C_6$-alkoxy, phenyl or halogen. Preferably L is $C_1$–$C_6$ alkylene (most preferably ethylene), $C_1$–$C_6$ alkylene arylene (most preferably $CH_2$-1,2-1,3 and 1,4-phenylene ) or arylene (most preferably 1,2-, 1,3- and 1,4-phenylene). Z is selected from

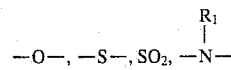

wherein m is 1 to 10.

The term "polyester reactive group" is used herein to describe a group which is reactive with at least one of the functional groups from which the polyester is prepared under polyester forming conditions. Examples of the polyester reactive groups, denoted by the letter X, include hydroxy, carboxy, amino, $C_1$ to $C_6$-alkylamino and ester radicals having the formulae

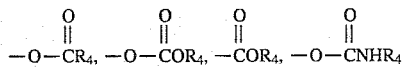

wherein $R_4$ is selected from the group consisting of $C_1$ to $C_6$-alkyl, $C_5$ to $C_7$-cycloalkyl, or aryl, wherein the terms "$C_1$ to $C_6$-alkyl", "$C_5$ to $C_7$-cycloalkyl", and "aryl" are as defined above.

When the terms "$C_1$ to $C_6$-alkoxycarbonyl" and "$C_1$ to $C_6$-alkanoyloxy" are used in the definition of L above, it is intended that the alkyl portion of the radicals contain 1 to 6 carbon atoms.

The preferred aromatic thioether compounds contain two polyester reactive groups X. The most preferred aromatic thioethers are those where Ar is naphthalene and which contain two polymerizable groups X. It is also preferred that L is $C_1$–$C_6$ alkylene, most preferably ethylene, or arylene, most preferably 1,2-, 1,3- and 1,4-phenylene. Preferred reactive groups X are selected from hydroxy, carboxy, $CO_2C_1$–$C_4$ alkyl and $OCOC_1$–$C_4$-alkyl.

The aromatic thioether compounds of Structure I are prepared by Method I or Method II.

Method I  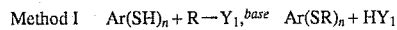

Method II 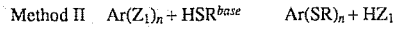

The intermediate arylthiol compounds II used in Method I are prepared by reacting an aromatic bromide and iodide with thiourea in the presence of a nickel metal catalyst as described in U.S. Pat. No. 5,338,886 which is incorporated herein by reference. Compounds II are then converted to aromatic thioethers I by reacting with Compounds III, where R is an organic radical selected from alkyl, cycloalkyl, alkenyl, alkynyl, aralkyl and aryl, and $Y_1$, is a leaving group selected from chlorine, bromine, iodine, alkylsulfonyloxy and arylsulfonyloxy. Ar, R and n have been previously defined.

Aromatic thioether compounds of Structure I may also be prepared by Method II which involves the reaction of aromatic halides IV, wherein $Z_1$ is selected from bromine and iodine, with an organic mercaptan V in the presence of base.

In preparing the preferred aromatic thioether compounds which contain a polyester reactive group, the group may be present in reactants III and V or may be introduced later into the aromatic thioether compounds of Structure I by a subsequent reaction.

The preferred bases for promoting the nucleophilic displacement reactions involved in Methods I and II are alkali metal hydroxides, bicarbonates and carbonates or tertiary amines. Useful solvents include polar aprotic materials such as N,N-dimethylformamide, N-methyl-2-pyrrolidinone, dimethylsulfoxide, etc.

Preferably, the polymer is a polyester containing repeat units from 0.1 to 100 mole percent of 2,6-naphthalenedicarboxylic acid or 2,6-naphthalenedicarboxylate ester, and 0 to 99.9 mole percent of terephthalic acid or dimethyl terephthalate, and at least 90 mole percent ethylene glycol.

Many other ingredients can be added to the compositions of the present invention to enhance the performance properties of the polymer. For example, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, and the like, can be included herein. All of these additives and the use thereof are well known in the art. Any of these compounds can be used so long as they do not hinder the present invention from accomplishing its objects.

The naphthalenedicarboxylic acid containing polymer with the fluorescence quenching compound is prepared by conventional polycondensation procedures well-known in the art which generally include a combination of melt phase and solid state polymerization. Melt phase describes the molten state of the naphthalenedicarboxylic acid containing polymer during the initial polymerization process. The initial polymerization process includes direct condensation of the naphthalenedicarboxylic acid with the diol or diamine or by ester interchange using naphthalenedicarboxylic ester. For example, dimethyl-2,6-naphthalenedicarboxylate is ester interchanged with ethylene glycol at elevated temperatures in the presence of the copolymerizable aromatic thioether compound and a catalyst. The melt phase is concluded by extruding the naphthalenedicarboxylic acid polymer into strands and pelletizing. Optionally, the aromatic thioether compound, either with or without copolymerizable groups, can be melt blended with the naphthalenedicarboxylic acid containing polymer. This can be accomplished either by directly blending the naphthalenedicarboxylic acid containing polymer and the aromatic thioether compound or by blending the naphthalenedicarboxylic acid containing polymer with a concentrate or masterbatch containing the aromatic thioether compound.

The naphthalenedicarboxylic acid containing polymer with the fluorescence quenching compound may optionally be solid state polymerized. Solid state polymerization involves heating the polymer pellets to a temperature in excess of 200° C., but well below the crystalline melting point, either in the presence of an inert gas stream or in a vacuum to remove a diol. Several hours are generally required in the solid state polymerization unit to build the molecular weight.

Typical catalysts which may be used include titanium alkoxides, dibutyl tin dilaurate, combinations of zinc, manganese, or magnesium acetates or benzoates with antimony oxide or antimony triacetate.

The inherent viscosity of the naphthalenedicarboxylic acid containing polymer should be 0.3 to 1.5 dL/g. However, inherent viscosities of from 0.5 to 0.9 are preferred, as measured at 25° C. using 0.5 grams of polymer per 100 ml of a solvent consisting of 60% by weight phenol and 40% by weight tetrachloroethane.

Additives such as fillers, for example, titanium dioxide and talc, stabilizers, antioxidants, buffers, colorants, dyes, pigments and the like normally used with polymers may be used if desired. Such additives, their amounts, and their use are well known in the art.

The naphthalenedicarboxylic acid containing polymer compositions serve as excellent starting materials for the production of moldings of all types. The naphthalenedicarboxylic acid containing polymers may also be blended with other polymers. Specific applications include food packaging such as bottles, trays, lids and films, medical parts, appliance parts, automotive parts, tool housings, recreational and utility parts. The molding compositions of the present invention are especially useful in applications that require transparent molded parts. Additionally, the polymers can be used to prepare extruded sheets for thermoforming applications. The polymers are readily extruded into films or processed into monolayer or multilayer food and beverage containers. Potential methods for producing containers include: (1) injection stretch blow molding using either one or two stage technology, (2) injection blow molding, (3) extrusion blow molding, (4) pipe extrusion, and (5) coinjection or coextrusion where the polymers can serve as either the structural layer or barrier layer depending upon end use requirements. Fibers, melt-blown webs, extruded sheets, vacuum- drawn trays/parts, Injection molded parts, and extrusion coated wires may also be made from these polymers.

The materials and testing procedures used for the results shown herein are as follows:

Fluorescence Intensity was determined using a Perkin-Elmer LS5B Luminescence Spectrometer which measured relative fluorescence intensity at peak maxima.

Inherent viscosity (I.V.) was measured at 25° C. using 0.50 grams of polymer per 100 ml of a solvent consisting of 60% by weight phenol and 40% by weight tetrachloroethane.

Sample preparation for determining fluorescence intensity involved grinding the polyester samples to 3–4 mm. The samples were micropulverized in an analytical grinding mill and passed through a 120 mesh screen. The powders were dried for 24 hours at 140° C. Approximately 0.5 grams of the powder was packed into a sample holder and measurements were taken by reflectance. The excitation wavelength was 350 nm and the emission maximum was 428–432 nm unless listed otherwise. The values are reported as normalized to poly(ethylene- 2,6-naphthalenedicarboxylate) (fluorescence intensity 100). The fluorescence intensity of poly(ethylene-2,6-naphthalenedicarboxylate) was repeated 10 times with a standard deviation of 5.0. Two measurements were taken of all other samples and the averages are reported in Tables I–III.

The present invention will be further illustrated by a consideration of the following examples, which are intended to be exemplary of the invention.

EXAMPLE 1

Preparation of 1,4-Bis (2-hydroxyethylthio)benzene (BzHET)

A mixture of 1,4-benzenedithiol (45.0 grams, 0.32 mole), sodium hydroxide (26.0 grams, 0.64 mole) and water (150 mL) was heated and stirred under nitrogen. After complete solution of the solid, 2-chloroethanol (52.2 grams, 0.64 mole) was added gradually to the reaction mixture and then heating was continued for about 2.0 hours at reflux temperature. The resulting precipitate was collected by vacuum filtration, washed with water and dried in a vacuum desiccator. A good yield of the desired product, 1,4-bis(2 -hydroxyethylthio)benzene, melting point 92° C. was obtained.

EXAMPLE 2

Preparation of 4,4'-Bis(2-hydroxyethylthio)diphenyl ether (DEHET)

A reaction mixture of 4,4'-dimercaptodiphenylether (40.1 grams, 0.17 mole), 50% NaOH [28.0 grams (14.0 grams, 0.35 mole NaOH)], water (100 mL) and 2 β ethanol (60.0 mL) was heated and stirred under nitrogen while 2-chloroethanol (30.0 grams, 0.37 mole) was added dropwise at reflux temperature. The reaction mixture was heated for 1.5 hours after the addition was complete. Heating was discontinued and the reaction mixture allowed to stand overnight. Additional water (50.0 mL) was added to make the reaction mixture more stirrable. The product was collected by vacuum filtration, washed well with water and then dried in air (yield 59.5 grams).

To remove some of the color the dry product was dissolved in toluene (600 mL) by heating to 85°–95° C. in the presence of activated charcoal (~5.0 grams); the solution was filtered hot to remove the charcoal. The filtrate was then allowed to cool and the product was washed with cold methanol and then collected by vacuum filtration and dried in air. The yield of desired product which melted at 105°–106° C. was 24.1 grams. Field desorption mass spectrometry (FDMS) supported the proposed structure (molecular ion weight was 322).

EXAMPLE 3

Preparation of 4,4'-Bis(2-hydroxyethylthio)biphenyl (BPHET)

A mixture of 4,4'-dimercaptobiphenyl (41.7 grams, 0.19 mole), 50% NaOH [31.2 grams (15.6 grams, 0.39 mole NaOH)], water (100 mL) and 2 β ethanol (60 mL) was heated under nitrogen under stirring while 2-chloroethanol (31.5 grams, 0.39 mole) was added dropwise at reflux. When addition was completed, additional 2 β ethanol (60 mL) was added to facilitate stirring. After being heated an additional 2.0 hours at reflux, the reaction mixture was allowed to cool and the product was collected by vacuum filtration, washed with water and dried in air.

The off-white product (54.5 grams) was recrystallized from 2-ethoxyethanol (900 mL) and then collected by vacuum filtration, washed with cold methanol and dried in air to yield 41.4 grams of recrystallized product which melted at 181°–183° C. Field desorption mass spectroscopy (FDMS) supported the desired structure (molecular ion weight—306).

Additional color was removed from the product by heating to solution in N,N-dimethylformamide (300 mL) in the presence of activated charcoal, followed by hot filtration through Celite filter aid to remove carbon and drowning of the filtrate into methanol (450 mL) to produce an essentially white precipitate, which was collected by vacuum filtration, washed with cold methanol and dried in air. The final yield of purified product was 30.8 grams of material which melted at 182°–184° C.

EXAMPLE 4

Preparation of 2,6-Bis(2-hydroxyethylthio)naphthalene (NHET)

A mixture of 2,6-naphthalenediol (15.9 grams, 0.083 mole), sodium hydroxide (6.65 grams, 0.166 mole) and water (150 ml) was heated at near reflux temperature under nitrogen and 2-bromoethanol (20.7 grams, 0.166 mole) was added in three portions with good stirring. Reaction mixture was heated at reflux for one hour longer. The white product which had formed was collected by vacuum filtration and washed with water. After recrystallization from ethanol, the product was collected by filtration and dried in a vacuum desiccator (yield 9.5 grams, m.p. 113°–117° C). The compound was confirmed by gas chromatography and field desorption mass spectroscopy (molecular ion weight was 280). The compound had the following structure:

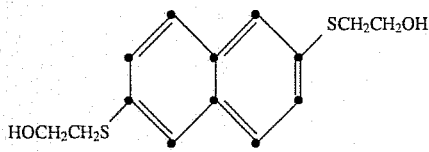

EXAMPLE 5

Bromination of 2,6-Bis(2-hydroxyethylthio)naphthalene

A portion (2.80 grams, 0.01 mole) of the 2,6-bis(2-hydroxyethylthio)naphthalene prepared in Example 4 was added to methylene chloride and the slurry stirred. Bromine (3.4 grams, 0.021 mole) in methylene chloride (25 ml) was added dropwise with stirring over one hour at ambient temperature. After stirring the reaction mixture for an additional hour at room temperature, the light peach colored solid was collected by filtration, washed with methylene chloride and air dried (yield 4.8 grams).

The crude product was reslurried in methanol (30 ml), collected by filtration, washed with methanol to give 3.1 grams of brominated product which melted at 163°–167° C. Field desorption mass spectroscopy showed the product to be a mixture of mono- and di-brominated material with the di-brominated product (molecular ion weight was 436) being present as the major component.

EXAMPLE 6

Preparation of 2,6-bis(2-carboxyphenylthio)naphthalene

A mixture of 2,6-diiodonaphthalene (38.0 grams, 0.10 mole), thiosalicyclic acid (30.8 grams, 0.20 mole), potassium carbonate (27.3 grams, 0.20 mole) and N,N-dimethylformamide (200 ml) was heated and stirred at 130°–135° C. for 8 hours. An isolated sample showed mostly starting material and half-reacted product. More N,N-dimethylformamide (50.0 ml) was added and the reaction mixture was heated for an additional 30 hours at about 150° C. The reaction mixture was drowned into water (500 ml) and the "milky" mixture was filtered using Celite filter aid to remove the unreacted 2,6-diiodonaphthalene. The filtrate was acidified with concentrated HCl to precipitate the product which was collected by filtration and washed with water. The wet cake was ground using a mortar and pestle and then reslurried in methanol. After collecting the solid by filtration, washing with methanol and drying in air, forty grams of crude product were obtained.

The crude product was heated in acetic acid (500 ml) to 95° C. and the resulting mixture filtered hot through a fritted glass funnel to collect the insoluble portion, which was washed with warm acetic acid, water and finally methanol and air dried (21.5 grams). The product was again heated to 95° C. in acetic acid and the resulting mixture filtered hot through a fritted funnel to collect the insoluble product, which again was washed with water and methanol and dried in air. The hot acetic acid reslurries appeared to remove most of the half-reacted product VI from the reaction product leaving mostly the desired twice-reacted product VII as evidenced by field desportion mass spectrometry.

Compound VI had the following structure:

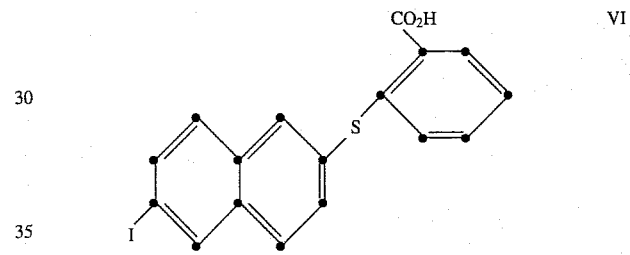

Compound VII had the following structure:

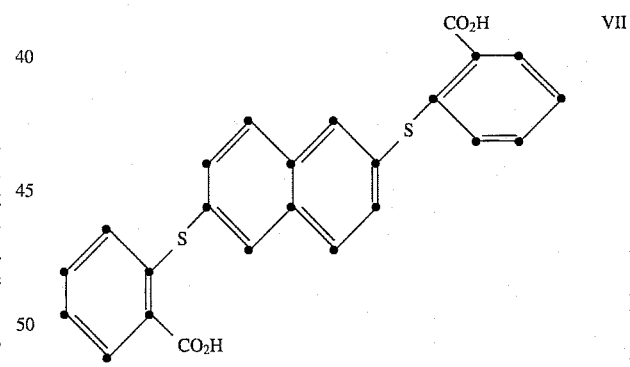

EXAMPLE 7

Preparation of 2,6-Bis(2-carboxyphenylthio)naphthalene (NCPT)

A mixture of 2,6-bis(2-carboxyphenylthio)naphthalene (8.64 grams, 0.02 mole), anhydrous $K_2CO_3$ (0.04 mole), potassium iodide (0.1 gram), iodoethane (9.6 grams, 0.06 mole) and N,N-dimethylformamide (85.0 ml) was heated and stirred at 80°–90° C. for two hours. Methanol (25 ml) was added with stirring to the reaction mixture at room temperature, followed by the addition of cold water (125 ml). The tan slightly "tacky" solid was collected by filtration, washed with water and then dried in air (yield 9.1 grams).

Some of the color was removed from the product by heating in toluene (75 ml) in the presence of activated charcoal, followed by filtering hot through a Celite filter aid pad on a sintered glass funnel. The product was isolated by cooling the filtrate and removing the toluene solvent with a stream of nitrogen to a total volume of about 40 ml, followed by filtration. After washing the solid with chilled toluene and then heptane, the near white product was dried in air (yield 5.3 grams, m.p. 159°–161° C.). Field desorption mass spectroscopy (molecular ion weight was 488). The compound had the following structure:

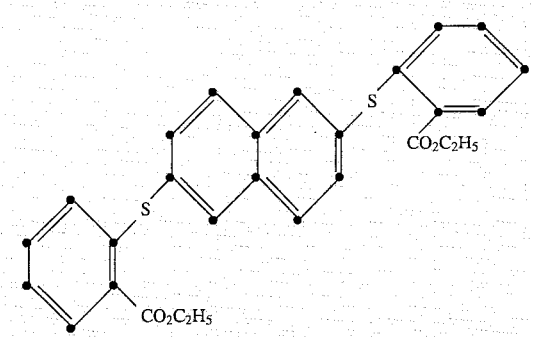

EXAMPLES 8–108

Examples 8–108 provide additional aromatic thioether compounds which are useful as fluorescence quenchers.

TABLE I

| | AROMATIC THIOETHERS HAVING THE FORMULA Ar(SR)n | | |
|---|---|---|---|
| Example | Ar | R | n |
| 8 | (phenyl) | $-CH_2CO_2CH_3$ | 2 |
| 9 | (phenyl) | $-CH_2-$(phenyl)$-CO_2CH_3$ | 2 |
| 10 | $CH_3-$(phenyl) | $-$(phenyl)$-CO_2CH_3$ | 2 |

| | ARYL THIOETHERS Ar(SR)$_n$ | | |
|---|---|---|---|
| Example | Ar | R | n |
| 11 | $C_4H_{9n}-$(phenyl) | (phenyl with $CO_2CH_3$, $CO_2CH_3$) | 1 |
| 12 | (biphenyl) | $-CH_2CH=CH_2$ | 1 |
| 13 | $CH_3O_2C-$(phenyl) | $-CH_2C\equiv CH_2$ | 1 |
| 14 | (phenyl) | (phenyl) | 2 |

TABLE I-continued

| # | Structure 1 | Structure 2 | n |
|---|---|---|---|
| 15 | 4-ethoxyphenyl (with methyl) | 4-(CO₂CH₃)phenyl | 2 |
| 16 | 4-chlorophenyl (with methyl) | 4-methylphenyl | 2 |
| 17 | 4-bromophenyl (with methyl) | 3,4-dichlorobenzyl (–CH₂–) | 2 |
| 18 | 4-methylphenyl | 4-bromophenyl | 2 |
| 19 | 2,2'-dimethylbiphenyl-4,4'-diyl | CH₃ | 2 |
| 20 | biphenyl-4,4'-diyl | CH₂CH₃ | 2 |
| 21 | 2,2'-dichlorobiphenyl-4,4'-diyl | C₄H₉-n | 2 |
| 22 | biphenyl-4,4'-diyl | –CH₂COOH | 2 |
| 23 | biphenyl-4,4'-diyl | –CH₂CO₂CH₃ | 2 |
| 24 | biphenyl-4,4'-diyl | phenyl | 2 |
| 25 | 3,3'-dimethylbiphenyl-4,4'-diyl | 4-methylphenyl | 4 |
| 26 | biphenyl-4,4'-diyl | –CH₂CH₂OC(=O)CH₃ | 2 |

TABLE I-continued
| | | | |
|---|---|---|---|
| 27 | 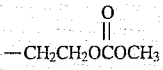 | $-CH_2CH_2OCOCH_3$ (C=O) | 2 |
| 28 | 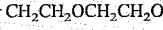 | $-CH_2CH_2OCH_2CH_2OH$ | 2 |
| 29 |  | $-CH_2-\!\!\bigcirc\!\!-CH_2OH$ | 2 |
| 30 |  | $-CH_2-\!\!\bigcirc\!\!-CH_2OH$ | 2 |
| 31 | 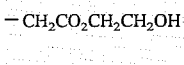 | $-CH_2CO_2CH_2CH_2OH$ | 2 |
| 32 | 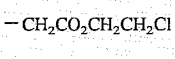 | $-CH_2CO_2CH_2CH_2Cl$ | 2 |
| 33 | 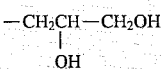 | $-CH_2-CH-CH_2OH$<br>$\quad\quad\;\;|$<br>$\quad\quad\;OH$ | 1 |
| 34 |  | $-\!\!\bigcirc\!\!-CO_2CH_3$ | 2 |
| 35 |  | $-CH_2CH_2-\!\!\bigcirc\!\!-CO_2CH_3$ | 2 |
| 36 |  | $-CH_3$ | 4 |
| 37 | 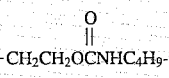 | $-CH_2CH_2OCNHC_4H_9\text{-}n$ (C=O) | 2 |
| 38 | 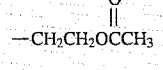 | $-CH_2CH_2OCCH_3$ (C=O) | 6 |

TABLE I-continued
| | | | |
|---|---|---|---|
| 39 | 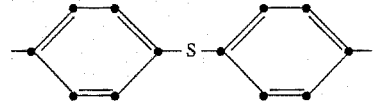 | 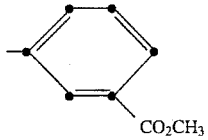—CO₂CH₃ | 2 |
| 40 | 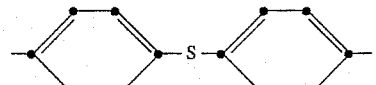 | 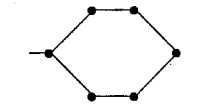 | 2 |
| 41 | 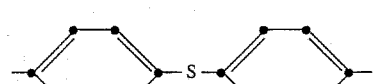 | —CH₂CO₂C₁₂H₂₅ | 2 |
| 42 | 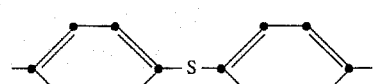 | —CH₂CH₂CO₂CH₂CH₂CN | 2 |
| 43 |  | —CH₂CH₂S——CO₂CH₃ | 2 |
| 44 | 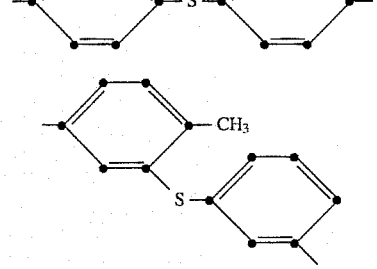 | —CH₂CH₂O—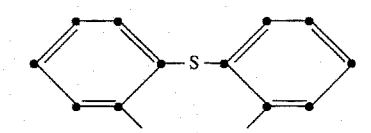—CO₂CH₃ | 2 |
| 45 | 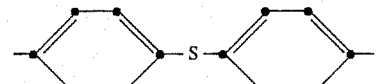 | —CH₂CH₂OH | 2 |
| 46 | 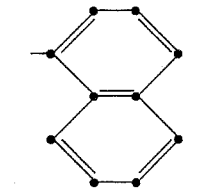 | —CH₂CH₂S—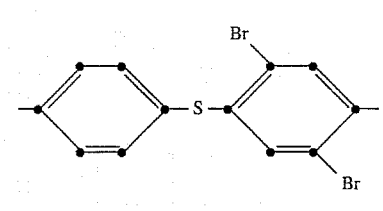—SCH₂CH₂OH | 2 |
| 47 | 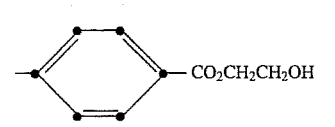 | 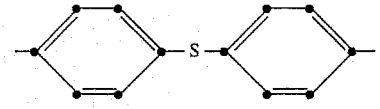 | 2 |
| 48 | 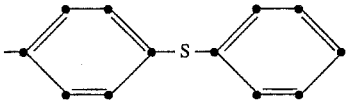 | —CO₂CH₂CH₂OH | 2 |
| 49 |  |  | 2 |

TABLE I-continued

| # | Ar | R | n |
|---|---|---|---|
| 50 | –C₆H₄–S–C₆H₄– | –CH₂CH₂O–C₆H₄–OCH₂CH₂OH | 2 |
| 51 | –C₆H₄–S–C₆H₄– | –CH₂CH₂O–C₆H₃(CO₂CH₃)(CO₂CH₃) | 1 |
| 52 | –C₆H₄–N(CH₃)–C₆H₄– | –CH₂CH₂OH | 2 |
| 53 | –C₆H₄–N((CH₂)₈H)–C₆H₄– | –CH₂–C₆H₄–CO₂(CH₂)₈H | 2 |
| 54 | –C₆H₄–N(C₄H₃S)–C₆H₄– | –CH₂CH(OH)CH₃ | 2 |
| 55 | –C₆H₄–N(C₆H₅)–C₆H₄– | –CH₂CH₂SCH₂CH₂OH | 2 |
| 56 | –C₆H₄–C(CH₃)₂–C₆H₄– | –CH₂CH₂OCH₂CH₂OH | 2 |
| 57 | –(2-CH₃)C₆H₃–C(CH₃)₂–C₆H₃(3-CH₃)– | –CH₂CH₂N(CH₃)CH₂CH₂OH | 2 |
| 58 | –(2-Cl)C₆H₃–C(CH₃)₂–C₆H₃(3-Cl)– | –(CH₂)₄SO₂(CH₂)₄OH | 2 |

TABLE I-continued

| # | Structure 1 | Structure 2 | n |
|---|---|---|---|
| 59 | 2-CH₃-C₆H₄-C(CH₃)₂-C₆H₄-3-CH₃ | —(CH₂CH₂O)₃CH₂CH₂OH | 2 |
| 60 | C₆H₅-C(CH₃)(C₂H₅)-C₆H₄— | —C₆H₄-CO₂CH₃ | 2 |
| 61 | (C₆H₅)(C₆H₄)C(CH₃)(C₆H₄-SC₆H₅)— | —C₆H₅ | 2 |
| 62 | C₆H₅-C(CH₃)(C₄H₉-n)-C₆H₄— | —C₆H₄-CO₂CH₂CH₂CN | 2 |
| 63 | naphthalene-2,6-diyl | —C₆H₄-CO₂CH₃ | 2 |
| 64 | naphthalene-2,6-diyl | CH₂CO₂H | 2 |
| 65 | naphthalene-2,6-diyl | CH₂CO₂CH₃ | 2 |
| 66 | naphthalene-2,6-diyl | (CH₂)₆OH | 2 |
| 67 | naphthalene-2,6-diyl | —CH₂C(CH₃)₂CH₂OH | 2 |

TABLE I-continued

| # | Ar | R | n |
|---|---|---|---|
| 68 | naphthalene | $-CH_2CH(CH_3)CH_2OH$ | 2 |
| 69 | naphthalene | $-CH_2-C_6H_4-CO_2CH_3$ (para) | 2 |
| 70 | naphthalene | $-CH_2CH_2O-C_6H_4-CO_2CH_3$ (para) | 2 |
| 71 | naphthalene | $-C_6H_4-CO_2CH_3$ (meta) | 2 |
| 72 | naphthalene | $-C_6H_4-CO_2CH_3$ (ortho) | 2 |
| 73 | naphthalene | $-CH_2CH_2OCH_2CH_2OH$ | 2 |
| 74 | naphthalene | $-(CH_2CH_2O)_6CH_2CH_2OH$ | 2 |
| 75 | naphthalene | $-CH_2-C_6H_4-CH_2OH$ (para) | 2 |
| 76 | naphthalene | $-CH_2CH_2OCOCH_3$ | 2 |
| 77 | naphthalene | $-CH_2CH_2CH_2OCO_2C_2H_5$ | 2 |

TABLE I-continued

| 78 | (naphthalene) | $-CH_2CH_2CH_2CH_2OCOC_6H_{11}$ | 2 |
| 79 | (naphthalene) | $-CH_2CH_2OCO-\text{(phenyl)}$ | 2 |
| 80 | (naphthalene) | $-C_4H_{9-n}$ | 2 |
| 81 | (naphthalene) | $-CH_3$ | 2 |
| 82 | (naphthalene) | $-C_4H_{9-n}$ | 2 |
| 83 | (naphthalene) | (phenyl) | 2 |
| 84 | (naphthalene) | (phenyl-$CO_2CH_3$) | 2 |
| 85 | (naphthalene) | $CH_2CH=CH_2$ | 2 |
| 86 | (naphthalene) | $CH_2CH_2-\text{(phenyl)}$ | 2 |

TABLE I-continued
| 87 | 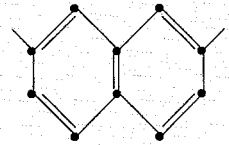 | $C_4H_{9-n}$ | 2 |
| 88 | 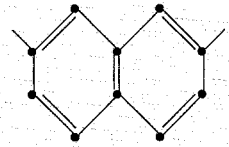 |  | 2 |
| 89 | 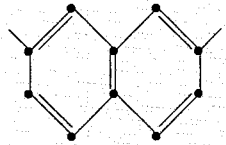 | $CH_2CH_2OH$ | 2 |
| 90 | 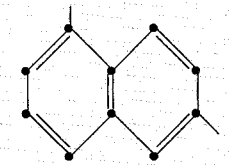 |  —Cl | 2 |
| 91 | 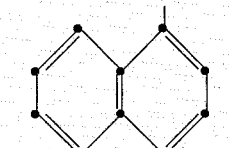 |  —$CH_3$ | 2 |
| 92 | 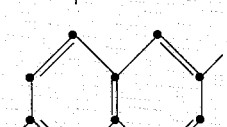 |  | 2 |
| 93 | 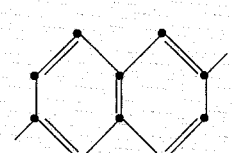 |  —$SC_4H_{9-n}$ | 2 |
| 94 | 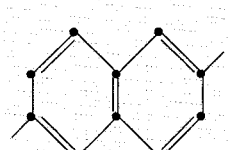 |  —$OC_2H_5$ | 2 |
| 95 | 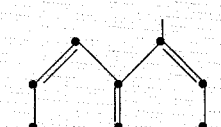 | 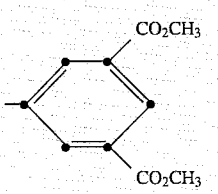 | 1 |

TABLE I-continued
| 96 | 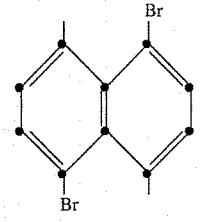 | —CH₂CH₂OH | 2 |
| 97 | 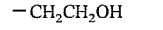 | 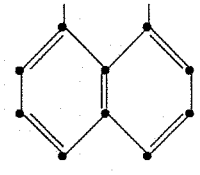 —CH₂— | 2 |
| 98 | 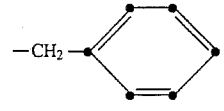 CH₃ | 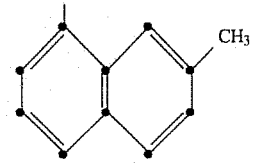 —OCH₃ | 1 |
| 99 | 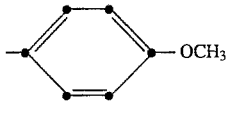 OCH₃ | —CH₂CH₂OH | 1 |
| 100 | 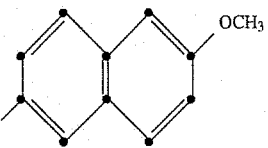 | 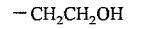 —CH₂— | 2 |
| 101 | 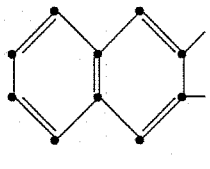 | (CH₂)₁₁CH₃ | 2 |
| 102 | 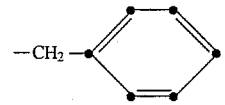 | 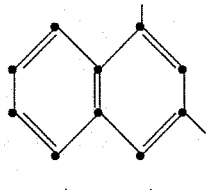 | 4 |
| 103 |  | 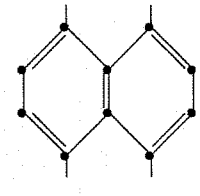 | 8 |
| 104 | 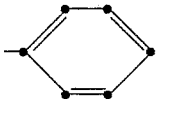 | 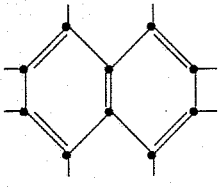 | 4 |

TABLE I-continued

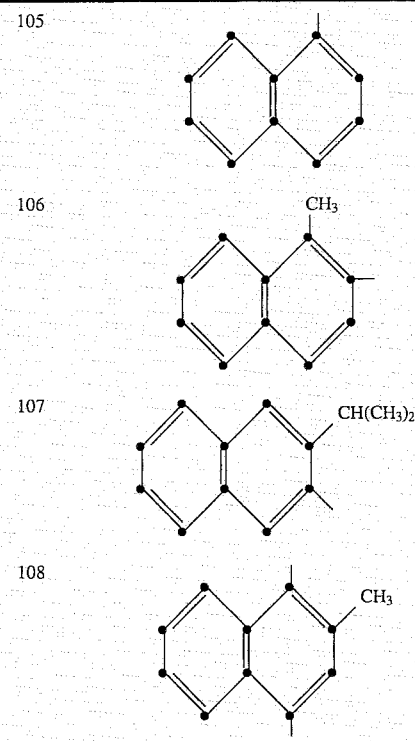

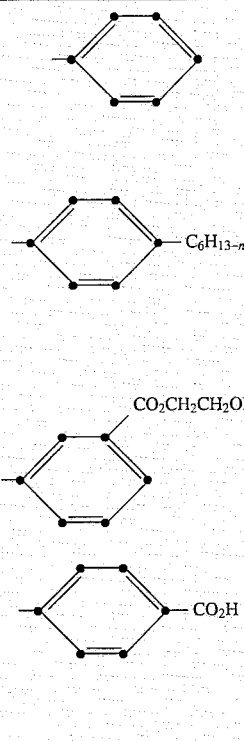

| | |
|---|---|
| 105 | 1 |
| 106 (CH₃) | 1 (—C₆H₁₃₋ₙ) |
| 107 (CH(CH₃)₂) | 1 (CO₂CH₂CH₂OH) |
| 108 (CH₃) | 2 (CO₂H) |

EXAMPLE 109

Poly(ethylene 2,6-naphthalenedicarboxylate) containing 0.5 mole percent copolymerized 1,4-bis(2-hydroxyethylthio)benzene was prepared by the following procedure.

Dimethyl 2,6-naphthalenedicarboxylate (0.4 mole, 97 grams), ethylene glycol (0.8 mole, 49.6 grams), 1,4-bis(2-hydroxyethylthio)benzene (0.002 mole, 0.46 grams) from Example 1, and catalyst metals which consisted of 85 ppm Co from Co(OAc)$_2$, 55 ppm Mn from Mn(OAc)$_2$, 225 ppm Sb from Sb(OAc)$_3$, and 116 ppm P from a phosphate ester compound, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 35 minutes. The polymer was cooled and ground. The polymer had 0.4 dL/g I.V. Fluorescence data are summarized in Table II (N2+0.5% BzHET).

EXAMPLE 110

Poly(ethylene 2,6-naphthalenedicarboxylate) containing 1.0 mole percent copolymerized 1,4-bis(2-hydroxyethylthio)benzene was prepared by the following procedure.

Dimethyl 2,6-naphthalenedicarboxylate (0.4 mole, 97 grams), ethylene glycol (0.8 mole, 49.6 grams), 1,4-bis(2-hydroxyethylthio)benzene (0.004 mole, 0.92 grams) from Example 1, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 65 minutes. The polymer was cooled and ground. The polymer had 0.5 dL/g I.V. Fluorescence data are summarized in Table II.

EXAMPLE 111

Poly(ethylene 2,6-naphthalenedicarboxylate) containing 4.0 mole percent copolymerized 1,4-bis(2-hydroxyethylthio)benzene was prepared by the following procedure.

Dimethyl 2,6-naphthalenedicarboxylate (0.4 mole, 97 gram), ethylene glycol (0.8 mole, 49.6 gram), 1,4-bis(2-hydroxyethylthio)benzene (0.016 mole, 3.68 gram) from Example 1, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 64 minutes. The polymer was cooled and ground. The polymer had 0.55 dL/g I.V. Fluorescence data are summarized in Table II.

EXAMPLE 112

Poly(ethylene 2,6-naphthalenedicarboxylate) containing 0.5 mole percent copolymerized 4,4'-bis(2-hydroxyethylthio)diphenyl ether was prepared by the following procedure.

Dimethyl 2,6-naphthalenedicarboxylate (0.4 mole, 97.6 gram), ethylene glycol (0.8 mole, 49.6 gram), 4,4'-bis(2-hydroxyethylthio)diphenyl ether (0.002 mole, 0.64 gram) from Example 2, and catalyst metals, as described in Example 109, were placed in a 0.5 L polymerization reactor

EXAMPLE 113

Poly(ethylene 2,6-naphthalenedicarboxylate) containing 1.0 mole percent copolymerized 4,4'-bis(2-hydroxyethylthio)diphenyl ether was prepared by the following procedure.

Dimethyl 2,6-naphthalenedicarboxylate (0.5 mole, 122 gram), ethylene glycol (1.0 mole, 62 gram), 4,4'-bis (2-hydroxyethylthio)diphenyl ether (0.005 mole, 1.61 gram) from Example 2, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 15 minutes. The polymer was cooled and ground. The polymer had 0.3 dL/g I.V. Fluorescence data are summarized in Table II.

EXAMPLE 114

Poly(ethylene 2,6-naphthalenedicarboxylate) containing 3.0 mole percent copolymerized 4,4'-bis(2-hydroxyethylthio)diphenyl ether was prepared by the following procedure.

Dimethyl 2,6-naphthalenedicarboxylate (0.4 mole, 97.6 gram), ethylene glycol (0.8 mole, 49.6 gram), 4,4'-bis(2-hydroxyethylthio)diphenyl ether (0.012 mole, 3.86 gram) from Example 2, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 20 minutes. The polymer was cooled and ground. The polymer had 0.39 dL/g I.V. Fluorescence data are summarized in Table II.

EXAMPLE 115

Poly(ethylene 2,6-naphthalenedicarboxylate) containing 0.1 mole percent copolymerized 2,6-bis(2-hydroxyethylthio)naphthalene was prepared by the following procedure.

Dimethyl 2,6-naphthalenedicarboxylate (0.4 mole, 97.5 gram), ethylene glycol (0.8 mole, 49.6 gram), 2,6 -bis(2-hydroxyethylthio)naphthalene (0.0004 mole, 0.11 gram) from Example 4, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 30 minutes. The polymer was cooled and ground. The polymer had 0.4 dL/g I.V. Fluorescence data are summarized in Table II.

EXAMPLE 116

Poly(ethylene 2,6-naphthalenedicarboxylate) containing 0.5 mole percent copolymerized 2,6-bis(2-hydroxyethylthio)naphthalene was prepared by the following procedure.

Dimethyl 2,6-naphthalenedicarboxylate (0.4 mole, 97 gram), ethylene glycol (0.8 mole, 49.6 gram), 2,6 -bis(2-hydroxyethylthio)naphthalene (0.002 mole, 0.56 gram) from Example 4, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 43 minutes. The polymer was cooled and ground. The polymer had 0.46 dL/g I.V. Fluorescence data are summarized in Table II.

EXAMPLE 117

Poly(ethylene 2,6-naphthalenedicarboxylate) containing 1.0 mole percent copolymerized 2,6-bis(2-hydroxyethylthio)naphthalene was prepared by the following procedure.

Dimethyl 2,6-naphthalenedicarboxylate (0.4 mole, 97 gram), ethylene glycol (0.8 mole, 49.6 gram), 2,6 -bis(2-hydroxyethylthio)naphthalene (0.004 mole, 1.12 gram) from Example 4, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 10 minutes. The polymer was cooled and ground. The polymer had 0.47 dL/g I.V. Fluorescence data are summarized in Table II.

EXAMPLE 118

Poly(ethylene 2,6-naphthalenedicarboxylate) containing 2.6 mole percent copolymerized 2,6-bis(2-hydroxyethylthio)naphthalene was prepared by the following procedure.

Dimethyl 2,6-naphthalenedicarboxylate (0.39 mole, 95.2 gram), ethylene glycol (0.8 mole, 49.6 gram), 2,6 -bis(2-hydroxyethylthio)naphthalene (0.01 mole, 2.80 gram) from Example 4, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 45 minutes. The polymer was cooled and ground. The polymer had 0.5 dL/g I.V. Fluorescence data are summarized in Table II.

EXAMPLE 119

Poly(ethylene 2,6-naphthalenedicarboxylate) containing 5.3 mole percent copolymerized 2,6-bis(2-hydroxyethylthio)naphthalene was prepared by the following procedure.

Dimethyl 2,6-naphthalenedicarboxylate (0.38 mole, 92.7 gram), ethylene glycol (0.8 mole, 49.6 gram), 2,6 -bis(2-hydroxyethylthio)naphthalene (0.02 mole, 5.6 gram) from Example 4, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 25 minutes. The polymer was cooled and ground. The polymer had 0.4 dL/g I.V. Fluorescence data are summarized in Table II.

EXAMPLE 120

Poly(ethylene 2,6-naphthalenedicarboxylate) containing 0.5 mole percent copolymerized 4,4'-bis(2-hydroxyethylthio)biphenyl was prepared by the following procedure.

Dimethyl 2,6-naphthalenedicarboxylate (0.4 mole, 97.6 gram), ethylene glycol (0.8 mole, 49.6 gram), 4,4'-bis(2-hydroxyethylthio)biphenyl (0.002 mole, 0.61 gram) from Example 3, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 20 minutes. The polymer was cooled and ground. The polymer had 0.36 dL/g I.V. Fluorescence data are summarized in Table II.

EXAMPLE 121

Poly(ethylene 2,6-naphthalenedicarboxylate) containing 1.0 mole percent copolymerized 4,4'-bis(2-hydroxyethylthio)biphenyl was prepared by the following procedure.

Dimethyl 2,6-naphthalenedicarboxylate (0.4 mole, 97.6 gram), ethylene glycol (0.8 mole, 49.6 gram), 4,4'-bis(2-hydroxyethylthio)biphenyl (0.004 mole, 1.22 gram) from Example 3, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 16 minutes. The polymer was cooled and ground. The polymer had 0.31 dL/g I.V. Fluorescence data are summarized in Table II.

EXAMPLE 122

Poly(ethylene 2,6-naphthalenedicarboxylate) containing 3.0 mole percent copolymerized 4,4'-bis(2-hydroxyethylthio)biphenyl was prepared by the following procedure.

Dimethyl 2,6-naphthalenedicarboxylate (0.4 mole, 97.6 gram), ethylene glycol (0.8 mole, 49.6 gram), 4,4'-bis(2-hydroxyethylthio)biphenyl (0.012 mole, 3.67 gram) from Example 3, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 20 minutes. The polymer was cooled and ground. The polymer had 0.38 dL/g I.V. Fluorescence data are summarized in Table II.

EXAMPLE 123

Poly(ethylene 2,6-naphthalenedicarboxylate) containing 1.0 mole percent copolymerized 2,6-bis(2-carboxyphenylthio)naphthalene was prepared by the following procedure.

Dimethyl 2,6-naphthalenedicarboxylate (0.1 mole, 24.2 gram), ethylene glycol (0.2 mole, 12.4 gram), 2,6-bis(2-carboxyphenylthio)naphthalene (0.001 mole, 0.49 gram) from Example 6, and catalyst metals, as described in Example 109, were placed in a 0.1 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 20 minutes. The polymer was cooled and ground. The polymer had 0.35 dL/g I.V. Fluorescence data are summarized in Table II.

EXAMPLE 124

Poly(ethylene 2,6-naphthalenedicarboxylate) containing 1.0 mole percent copolymerized bromo-2,6-bis(2-hydroxyethylthio)naphthalene was prepared by the following procedure.

Dimethyl 2,6-naphthalenedicarboxylate (0.1 mole, 24.4 gram), ethylene glycol (0.2 mole, 12.4 gram), bromo-2,6-bis(2-hydroxyethylthio)naphthalene (0.001 mole, 0.41 gram) from Example 5, and catalyst metals, as described in Example 109, were placed in a 0.1 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 21 minutes. The polymer was cooled and ground. The polymer had 0.35 dL/g I.V. Fluorescence data are summarized in Table II.

EXAMPLE 125

Poly(ethylene terephthalate) containing 5 mole percent copolymerized dimethyl 2,6-naphthalenedicarboxylate and 1.0 mole percent copolymerized 4,4'-bis(2-hydroxyethylthio)biphenyl was prepared by the following procedure.

Dimethyl terephthalate (0.713 mole, 138.2 gram), dimethyl 2,6-naphthalenedicarboxylate (0.0375 mole, 9.15 gram), ethylene glycol (1.5 mole, 93.0 gram), 4,4'-bis(2-hydroxyethylthio)biphenyl (0.0075 mole, 2.30 gram) from Example 3, and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C. the nitrogen flow was stopped and vacuum was applied. The polymer was stirred under vacuum (0.3 mm Hg) for 30 minutes. The polymer was cooled and ground. The polymer had 0.44 dL/g I.V. Fluorescence data are summarized in Table II.

EXAMPLE 126

Poly(butylene 2,6-naphthalenedicarboxylate) containing 30 mole percent copolymerized 1,4-cyclohexanedimethanol and 1.0 mole percent copolymerized 2,6-bis(2-hydroxyethylthio)naphthalene is prepared by the following procedure.

Dimethyl 2,6-naphthalenedicarboxylate (0.5 mole, 122 gram), 1,4-butanediol (0.7 mole, 63.0 gram), 1,4-cyclohexanedimethanol (0.15 mole, 21.6 gram), 2,6-bis(2-hydroxyethylthio)naphthalene (0.005 mole, 1.40 gram) from Example 4, and catalyst metals, as described in Example 109, are placed in a 0.5 L polymerization reactor under a nitrogen atmosphere. The mixture is heated with stirring at 200° C. for 90 minutes. The temperature is increased to 220° C. and maintained for 90 minutes. The temperature is increased to 260° C., the nitrogen flow is stopped and vacuum is applied. The polymer is stirred under vacuum (0.3–0.5 mm Hg) for 8 minutes. The polymer is cooled and ground yielding a polymer with about 0.4 dL/g I.V. Fluorescence data are summarized in Table II.

TABLE II

Fluorescence Properties of Naphthalenedicarboxylic Acid Containing Polymers Copolymerized with an Aromatic Thioether

| Example | Polymer Composition | Aromatic Thioether | Fluorescence Intensity | Max Wavelength (nm) |
|---|---|---|---|---|
| 109 | PEN | 0.5% BzHET | 48 | 427 |
| 110 | PEN | 1.0% BzHET | 37 | 429 |
| 111 | PEN | 4.0% BzHET | 11 | 430 |
| 112 | PEN | 0.5% DEHET | 66 | 427 |
| 113 | PEN | 1.0% DEHET | 41 | 426 |
| 114 | PEN | 3.0% DEHET | 25 | 430 |
| 115 | PEN | 0.1% NHET | 74 | 427 |
| 116 | PEN | 0.5% NHET | 32 | 429 |
| 117 | PEN | 1.0% NHET | 21 | 431 |
| 118 | PEN | 2.6% NHET | 10 | 436 |
| 119 | PEN | 5.3% NHET | 6 | 445 |
| 120 | PEN | 0.5% BPHET | 52 | 429 |
| 121 | PEN | 1.0% BPHET | 36 | 429 |
| 122 | PEN | 3.0% BPHET | 14 | 429 |
| 123 | PEN | 1.0% NCPT | 26 | 431 |
| 124 | PEN | 1.0% BRNHET | 16 | 431 |
| 125 | PET/5% PEN | 1.0% BPHET | 30 | 388 |
| 126 | PBN + 30% CHDM | 1.0% NHET | 20 | 423 |

BzHET = 1,4-bis(2-hydroxyethylthio)benzene
DEHET = 4,4'-bis(2-hydroxyethylthio)diphenyl ether
NHET = 2,6-bis(2-hydroxyethylthio)naphthalene
BPHET = 4,4'-bis(2-hydroxyethylthio)biphenyl
NCPT = 2,6-bis(2-carboxyphenylthio)naphthalene
BrNHET = bromo-2,6-bis(2-hydroxyethylthio)naphthalene The results in Table II clearly indicate that the aromatic thioether additives of this invention effectively reduce fluorescence intensity in a broad composition range of naphthalenedicarboxylic acid containing polymers.

EXAMPLE 127

Poly(ethylene 2,6-naphthalenedicarboxylate) containing 1.1 weight percent melt blended 2,6-bis(2-hydroxyethylthio)naphthalene is prepared by the following procedure.

PEN polymer prepared according to the procedure set forth in Comparison Example A is dried 12 to 16 hours at about 160° C. The dried PEN polymer (500 gram) is mixed with 2,6-bis(2-hydroxyethylthio)naphthalene (5.7 gram) from Example 4. The mixture is extruded through a lab scale extruder using a die temperature of 280° to 300° C. The molten blend is extruded into a rod which is cooled in a water bath and chopped into pellets. The pellets are crystallized by heating to about 220° to 230° C. for 30 to 45 minutes. Samples for fluorescence measurements are prepared as described above. Fluorescence data are summarized in Table III.

EXAMPLE 128

Poly(ethylene terephthalate) containing 5 mole percent copolymerized dimethyl 2,6-naphthalenedicarboxylate and 0.71 weight percent melt blended 2,6-bis(2-hydroxyethylthio)naphthalene is prepared by the following procedure.

Poly(ethylene terephthalate) containing 5 mole percent copolymerized dimethyl 2,6-naphthalenedicarboxylate (Polyester A) is prepared according to the procedure set forth in Comparison Example D. A concentrate of 2,6-bis(2-hydroxyethylthio)naphthalene (Concentrate A) is prepared by melt blending 25 weight percent of 2,6-bis(2-hydroxyethylthio)naphthalene from Example 4, with 75 weight percent Polyester A in an extruder and chopping the blend into pellets. Polyester A pellets (500 gram) are mixed with Concentrate A pellets (14.6 gram). The mixture is extruded through a lab scale extruder using a die temperature of 270° to 300° C. The molten blend is extruded into a rod which is cooled in a water bath and chopped into pellets. The pellets are crystallized by heating to about 170° to 190° C. for 30 to 45 minutes. Samples for fluorescence measurements are prepared as described above. Fluorescence data are summarized in Table III.

EXAMPLE 129

Poly(ethylene terephthalate) containing 5 mole percent copolymerized dimethyl 2,6-naphthalenedicarboxylate and 0.71 weight percent melt blended 2,6-bis(2-hydroxyethylthio)naphthalene is prepared by the following procedure.

Poly(ethylene terephthalate) containing 5 mole percent copolymerized dimethyl 2,6-naphthalenedicarboxylate (Polyester A) is prepared according to the procedure set forth in Comparison Example D. A concentrate of 2,6-bis(2-hydroxyethylthio)naphthalene (Concentrate B) is prepared by melt blending 25 weight percent of 2,6-bis(2-hydroxyethylthio)naphthalene from Example 4, with 75 weight percent poly(ethylene terephthalate) in an extruder and chopping the blend into pellets. Polyester A pellets (500 gram) are mixed with Concentrate B pellets (14.6 gram). The mixture is extruded through a lab scale extruder using a die temperature of 270° to 300° C. The molten blend is extruded into a rod which is cooled in a water bath and chopped into pellets. The pellets are crystallized by heating to about 170° to 190° C. for 30 to 45minutes. Samples for fluorescence measurements are prepared as described above. Fluorescence data are summarized in Table III.

EXAMPLE 130

Poly(ethylene terephthalate) containing 5 mole percent copolymerized dimethyl 2,6-naphthalenedicarboxylate and 1.7 weight percent melt blended 2,6-bis(n-butylthio)naphthalene is prepared by the following procedure.

Poly(ethylene terephthalate) containing 5 mole percent copolymerized dimethyl 2,6-naphthalenedicarboxylate (Polyester A) is prepared according to the procedure set forth in Comparison Example D. Polyester A pellets (500 gram) are mixed with 2,6-bis(n-butylthio)naphthalene (8.6 gram) (Example 80 in Table I). The mixture is extruded through a lab scale extruder using a die temperature of 270° to 300° C. The molten blend is extruded into a rod which is cooled in a water bath and chopped into pellets. The pellets are crystallized by heating to about 170° to 190° C. for 30 to 45 minutes. Samples for fluorescence measurements are prepared as described above. Fluorescence data are summarized in Table III.

EXAMPLE 131

Poly(ethylene 2,6-naphthalenedicarboxylate) containing 0.88 weight percent melt blended 2,6-bis(methylthio)naphthalene is prepared by the following procedure.

Poly(ethylene 2,6-naphthalenedicarboxylate) is prepared according to the procedure set forth in Comparison Example A. A concentrate of 2,6-bis(methylthio)naphthalene (Concentrate C) is prepared by melt blending 25 weight percent of 2,6-bis(methylthio)naphthalene (Example 81 in Table I) with 75 weight percent poly(ethylene 2,6-naphthalenedicarboxylate) in an extruder and chopping the blend into pellets. Poly(ethylene 2,6-naphthalenedicarboxylate) pellets (500 gram) are mixed with Concentrate C pellets (18.2 gram). The mixture is extruded through a lab scale extruder using a die temperature of 280° to 300° C. The molten blend is extruded into a rod which is cooled in a water bath and chopped into pellets. The pellets are crystallized by heating to about 220° to 230° C. for 30 to 45 minutes. Samples for fluorescence measurements are prepared as described above. Fluorescence data are summarized in Table III.

TABLE III

Fluorescence Properties of Naphthalenedicarboxylic Acid Containing Polymers Blended with an Aromatic Thioether

| Example | Polymer Composition | Aromatic Thioether | Fluorescence Intensity | Max Wavelength (nm) |
|---|---|---|---|---|
| 127 | PEN | 1.1% NHET | 25 | 430 |
| 128 | 95% PET/ 5% PEN | 0.71% NHET | 35 | 390 |
| 129 | 95% PET/ 5% PEN | 0.71% NHET | 35 | 390 |
| 130 | 95% PET/ 5% PEN | 1.7% BTN | 30 | 390 |
| 131 | PEN | 0.88% MTN | 25 | 430 |

NHET = 2,6-bis(2-hydroxyethylthio)naphthalene
BTN = 2,6-bis(n-butylthio)naphthalene
MTN = 2,6-bis(methylthio)naphthalene The results in Table III clearly indicate that the aromatic thioether additives of this invention effectively reduce fluorescence intensity in a broad composition range of naphthalenedicarboxylic acid containing polymers when added by melt blending either directly or via a concentrate. The naphthalenedicarboxylic acid containing polymer compositions with reduced fluorescence and are useful in applications where good heat resistance, high glass transition temperature and gas barrier properties are required.

COMPARISON EXAMPLE A

Poly(ethylene 2,6-naphthalenedicarboxylate) without any aromatic thioether.

Dimethyl 2,6-naphthalenedicarboxylate (0.4 mole, 97.6 gram), ethylene glycol (0.8 mole, 49.6 gram), and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C. the nitrogen flow was stopped and vacuum was applied. The polymer was stirred under vacuum (0.3 mm Hg) for 20 minutes. The polymer was cooled and ground. The polymer had 0.38 dL/g I.V. Fluorescence data for the polymer is summarized in Table IV.

COMPARISON EXAMPLE B

Poly(ethylene terephthalate) without any aromatic thioether.

Dimethyl terephthalate (0.75 mole, 145.5 gram), ethylene glycol (1.5 mole, 93.0 gram), and catalyst metals, as described in Example 109, were placed in a 0.5 L polymerization reactor under a nitrogen atmosphere. The mixture was heated with stirring at 200° C. for 60 minutes. The temperature was increased to 215° C. and maintained for 60 minutes. The temperature was increased to 285° C., the nitrogen flow was stopped and vacuum was applied. The polymer was stirred under vacuum (0.3–0.5 mmHg) for 30 minutes. The polymer was cooled and ground. The polymer had 0.35 dL/g I.V. Fluorescence data for the polymer is summarized in Table IV.

COMPARISON EXAMPLE C

Poly(ethylene terephthalate) containing 1 mole percent copolymerized dimethyl 2,6-naphthalenedicarboxylate without any aromatic thioether.

Dimethyl terephthalate (0.743 mole, 144.1 gram), dimethyl 2,6-naphthalenedicarboxylate (0.0075 mole, 1.83 gram), ethylene glycol (1.5 mole, 93.0 gram), and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 40 minutes. The polymer was cooled and ground. The polymer had an I.V. of 0.51 dL/g. Fluorescence data for the polymer is summarized in Table IV.

COMPARISON EXAMPLE D

Poly(ethylene terephthalate) containing 5 mole percent copolymerized dimethyl 2,6-naphthalenedicarboxylate without any aromatic thioether.

Dimethyl terephthalate (0.713 mole, 138.2 gram), dimethyl 2,6-naphthalenedicarboxylate (0.0375 mole, 9.15 gram), ethylene glycol (1.5 mole, 93.0 gram), and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 30 minutes. The polymer was cooled and ground. The polymer had 0.43 dL/g I.V. Fluorescence data for the polymer is summarized in Table IV.

COMPARISON EXAMPLE E

Poly(ethylene terephthalate) containing 25 mole percent copolymerized dimethyl 2,6-naphthalenedicarboxylate without any aromatic thioether.

Dimethyl terephthalate (0.563 mole, 109.1 gram), dimethyl 2,6-naphthalenedicarboxylate (0.187 mole, 45.7 gram), ethylene glycol (1.5 mole, 93.0 gram), and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 24 minutes. The polymer was cooled and ground. The polymer had 0.36 dL/g I.V. Fluorescence data for the polymer is summarized in Table IV.

COMPARISON EXAMPLE F

Poly(ethylene 2,6-naphthalenedicarboxylate) containing 50 mole percent copolymerized dimethyl terephthalate without any aromatic thioether.

Dimethyl 2,6-naphthalenedicarboxylate (0.375 mole, 91.5 gram), dimethyl terephthalate (0.375 mole, 72.7 gram), ethylene glycol (1.5 mole, 93.0 gram), and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 30 minutes. The polymer was cooled and ground. The polymer had 0.39 dL/g I.V. Fluorescence data for the polymer is summarized in Table IV.

COMPARISON EXAMPLE G

Poly(ethylene 2,6-naphthalenedicarboxylate) containing 25 mole percent copolymerized dimethyl terephthalate without any aromatic thioether.

Dimethyl 2,6-naphthalenedicarboxylate (0.563 mole, 137.3 gram), dimethyl terephthalate (0.187 mole, 36.4 gram), ethylene glycol (1.5 mole, 93.0 gram), and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C. the nitrogen flow was stopped and vacuum was applied. The polymer was stirred under vacuum (0.3 mm Hg) for 25 minutes. The polymer was cooled and ground. The polymer had 0.41 dL/g I.V. Fluorescence data for the polymer is summarized in Table IV.

COMPARISON EXAMPLE H

Poly(butylene 2,6-naphthalenedicarboxylate) was prepared without any aromatic thioether.

Dimethyl 2,6-naphthalenedicarboxylate (0.5 mole, 122.0 gram), 1,4-butanediol (1.0 mole, 90.1 gram), and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 285° C., the nitrogen flow was stopped and vacuum was applied. The polymer was stirred under vacuum (0.3 mm Hg) for 5 minutes. The polymer was cooled and ground. The polymer had 0.62 dL/g I.V. Fluorescence data for the polymer is summarized in Table IV.

COMPARISON EXAMPLE I

Poly(butylene 2,6-naphthalenedicarboxylate) containing 30 mole percent copolymerized 1,4-cyclohexanedimethanol without any aromatic thioether.

Dimethyl 2,6-naphthalenedicarboxylate (0.5 mole, 122.0 gram), 1,4-butanediol (0.7 mole, 63.0 gram), 1,4-cyclohexanedimethanol (0.15 mole, 21.6 gram) and catalyst metals, as described in Example 109, were placed in a 0.5 L polymerization reactor under a nitrogen atmosphere. The mixture was heated with stirring at 200° C. for 90 minutes. The temperature was increased to 220° C. and maintained for 90 minutes. The temperature was increased to 260° C., the nitrogen flow was stopped and vacuum was applied. The polymer was stirred under vacuum (0.3–0.5 mm Hg) for 12 minutes. The polymer was cooled and ground. The polymer had 0.52 dL/g I.V. Fluorescence data for the polymer is summarized in Table IV.

TABLE IV

| Comparison Example | Polymer Composition | Relative Fluorescence Intensity | Max Wavelength (nm) |
|---|---|---|---|
| | Fluorescence Properties of Naphthalenedicarboxylic Acid Containing Polymers without any Aromatic Thioether | | |
| A | PEN | 100 | 429 |
| B | PET | 33 | 389 |
| C | 99% PET/1% PEN | 227 | 380 |
| D | 95% PET/5% PEN | 215 | 386 |
| E | 75% PET/25% PEN | 115 | 412 |
| F | 50% PET/50% PEN | 105 | 423 |
| G | 25% PET/75% PEN | 100 | 426 |
| H | PBN | 74 | 428 |
| I | PBN + 30% CHDM | 64 | 421 |

PEN = poly(ethylene 2,6-naphthalenedicarboxylate)
PBN = poly(butylene 2,6-naphthalenedicarboxylate)
CHDM = 1,4-cyclohexanedimethanol
PET = poly(ethylene terephthalate)

The results in Table IV clearly indicate that naphthalenedicarboxylic acid containing polymers have a significant fluorescence intensity even when naphthalenedicarboxylic acid is a minor component. Unexpectedly, PET copolymerized with as little as 1 mole percent naphthalenedicarboxylate has a greater fluorescence intensity than PEN homopolymer.

Many variations will suggest themselves to those skilled in this art in light of the above detailed description. All such obvious modifications are within the full intended scope of the appended claims.

What is claimed is:

1. A naphthalenedicarboxylic acid containing polymer composition with reduced fluorescence comprising condensation residues of:

(a) a dicarboxylic acid component which comprises at least 0.1 mole percent of 2,6-naphthalenedicarboxylic acid or 2,6-naphthalenedicarboxylate ester;

(b) a diol or diamine component; and (c) 0.1 to 5 mole percent, based on 100 mole percent dicarboxylic acid and 100 mole percent diol or diamine, of an aromatic thioether having the formula $Ar(SR)_n$ wherein n is 1 or more; R is selected from the group consisting of $C_1$ to $C_{12}$-alkyl, $C_5$ to $C_7$-cycloalkyl, $C_3$ to $C_8$-alkenyl, $C_3$ to $C_8$-alkynyl, aryl, and —L—X, wherein L is an organic divalent linking group, and X is a polyester reactive group; Ar is an aromatic radical selected from the group consisting of benzene, naphthalene, biphenyl, and

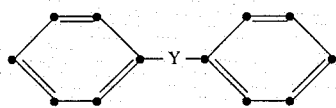

wherein Y is selected from the group consisting of

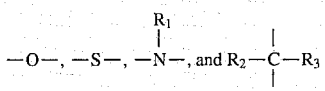

wherein $R_1$ is selected from the group consisting of $C_1$ to $C_{12}$-alkyl, $C_5$ to $C_7$-cycloalkyl, aryl, and —L—X, and $R_2$ and $R_3$ are independently selected from the group consisting of $C_1$ to $C_6$-alkyl and aryl, provided that at least one polyester reactive group X is present on the aromatic thioether.

2. A naphthalenedicarboxylic acid containing polymer composition with reduced fluorescence comprising condensation residues of:

(a) a dicarboxylic acid component which comprises at least 85 mole percent of 2,6-naphthalenedicarboxylic acid or 2,6-naphthalenedicarboxylate ester;

(b) a diol component; and (c) 0.1 to 5 mole percent, based on 100 mole percent dicarboxylic acid and 100 mole percent diol or diamine, of an aromatic thioether having the formula $Ar(SR)_n$ wherein n is 1 or more; R is selected from the group consisting of $C_1$ to $C_{12}$-alkyl, $C_5$ to $C_7$-cycloalkyl, $C_3$ to $C_8$-alkenyl, $C_3$ to $C_8$-alkynyl, aryl, and —L—X, wherein L is an organic divalent linking group, and X is a polyester reactive group; Ar is an aromatic radical selected from the group consisting of benzene, naphthalene, biphenyl, and

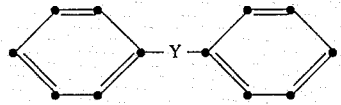

wherein Y is selected from the group consisting of

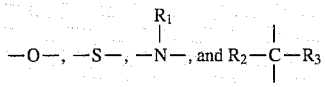

wherein $R_1$ is selected from the group consisting of $C_1$ to $C_{12}$-alkyl, $C_5$ to $C_7$-cycloalkyl, aryl, and —L—X, and $R_2$ and $R_3$ are independently selected from the group consisting of $C_1$ to $C_6$-alkyl and aryl, provided that at least one polyester reactive group X is present on the aromatic thioether.

3. A naphthalenedicarboxylic acid containing polymer composition with reduced fluorescence comprising condensation residues of:

(a) a dicarboxylic acid component consisting essentially of a dicarboxylic acid selected from the group consisting of naphthalene-2,6-dicarboxylic acid, and naphthalene-2,6-dicarboxylate ester;

(b) a diol component consisting essentially of ethylene glycol; and (c) 0.1 to 5 mole percent, based on 100 mole percent dicarboxylic acid and 100 mole percent diol or diamine, of an aromatic thioether having the formula $Ar(SR)_n$ wherein n is 1 or more; R is selected from the group consisting of $C_1$ to $C_{12}$-alkyl, $C_5$ to $C_7$-cycloalkyl, $C_3$ to $C_8$-alkenyl, $C_3$ to $C_8$-alkynyl, aryl, and —L—X, wherein L is an organic divalent linking group, and X is a polyester reactive group; Ar is an aromatic radical selected from the group consisting of benzene, naphthalene, biphenyl, and

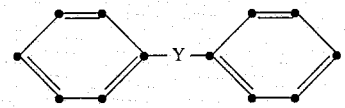

wherein Y is selected from the group consisting of

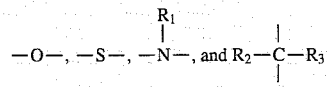

wherein $R_1$ is selected from the group consisting of $C_1$ to $C_{12}$-alkyl, $C_5$ to $C_7$-cycloalkyl, aryl, and —L—X, and $R_2$ and $R_3$ are independently selected from the group consisting of $C_1$ to $C_6$-alkyl and aryl, provided that at least one polyester reactive group X is present on the aromatic thioether.

4. The composition of claim 1 wherein the aromatic thioether compound, component (c), contains two polyester reactive groups and Ar is an aromatic radical selected from the group consisting of benzene, naphthalene and biphenyl.

5. The composition of claim 4 wherein Ar is a 2,6-naphthalenediyl radical.

6. The composition of claim 1 wherein the polyester reactive group X is selected from the group consisting of hydroxy, carboxy, amino, $C_1$ to $C_6$-alkylamino and ester radicals having the formulae

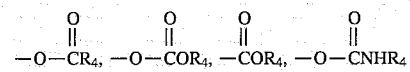

wherein $R_4$ is selected from the group consisting of $C_1$ to $C_6$-alkyl, $C_5$ to $C_7$-cycloalkyl, and aryl.

7. The composition of claim 6 wherein the polyester reactive group X is selected from the group consisting of hydroxy, carboxy, $CO_2C_1$–$C_4$ alkyl and $OCOC_1$–$C_4$-alkyl.

8. The composition of claim 1 wherein the organic divalent linking group L is selected from the group consisting of $C_1$ to $C_{12}$-alkylene, $C_1$ to $C_4$-alkylenecyclohexylene-$C_1$ to $C_4$-alkylene, arylene, $C_1$ to $C_4$-alkylene arylene, $C_1$ to $C_4$-alkylene-S-arylene, $C_1$ to $C_4$-alkylene-O-arylene, $C_1$ to $C_4$-alkylene-arylene-$C_1$ to $C_4$-alkylene, $C_1$ to $C_4$-alkylene-S-arylene-S-$C_1$ to $C_4$-alkylene, $C_1$ to $C_4$-alkylene-O-arylene-O-$C_1$ to $C_4$-alkylene, $C_1$ to $C_4$-alkylene-Z-$C_1$ to $C_4$-alkylene and —$(CH_2CH_2O)_mCH_2CH_2$—,
wherein the alkyl portion contains 1 to 6 carbon atoms and Z is selected from the group consisting of

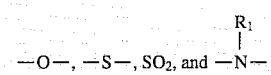

wherein m is 1 to 10.

9. The composition of claim 8 wherein the organic divalent linking group L is selected from the group consisting of $C_1$–$C_6$ alkylene, $C_1$–$C_6$ alkylene arylene, and arylene.

10. The composition of claim 9 wherein the organic divalent linking group L is selected from the group consisting of ethylene, 1,2-phenylene, 1,3-phenylene, and 1,4-phenylene.

11. The polymeric composition of claim 1 wherein the aromatic thioether compound is
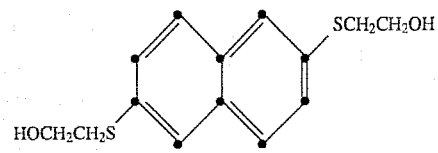
12. The polymeric composition of claim 1 wherein the aromatic thioether compound is
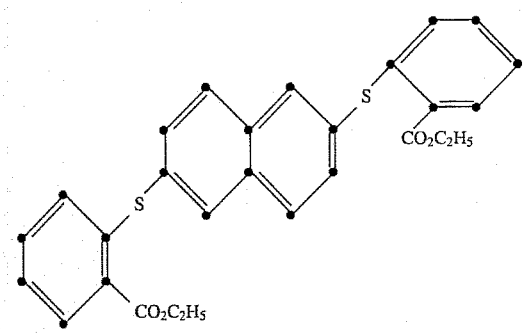
13. The polymeric composition of claim 1 wherein the aromatic thioether compound is
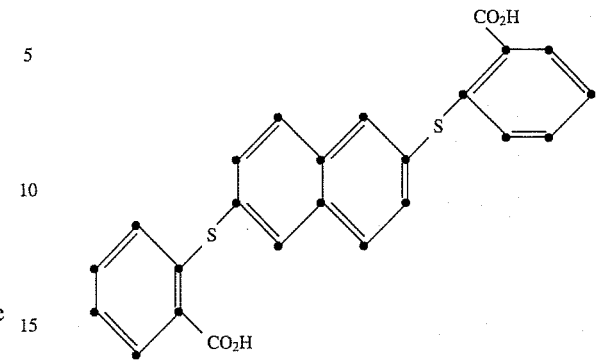
14. The polymeric composition of claim 1 wherein the aromatic thioether compound is
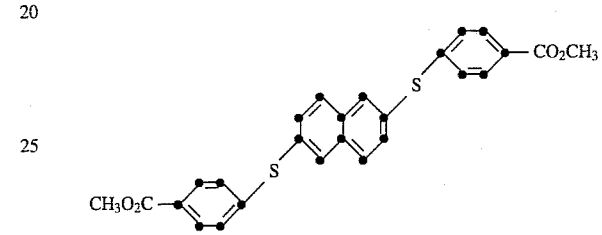
* * * * *